(12) United States Patent
Tan et al.

(10) Patent No.: US 10,775,314 B2
(45) Date of Patent: Sep. 15, 2020

(54) SYSTEMS AND METHOD FOR HUMAN-ASSISTED ROBOTIC INDUSTRIAL INSPECTION

(71) Applicant: General Electric Company, Schenectady, NY (US)

(72) Inventors: Huan Tan, Clifton Park, NY (US); Li Zhang, Clifton Park, NY (US); Romano Patrick, Niskayuna, NY (US); Arpit Jain, Niskayuna, NY (US); Guangliang Zhao, Latham, NY (US); Jilin Tu, Rexford, NY (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 378 days.

(21) Appl. No.: 15/809,531

(22) Filed: Nov. 10, 2017

(65) Prior Publication Data
US 2019/0145902 A1 May 16, 2019

(51) Int. Cl.
*G01N 21/88* (2006.01)
*G06N 20/00* (2019.01)
(Continued)

(52) U.S. Cl.
CPC ..... *G01N 21/8803* (2013.01); *G01N 21/8851* (2013.01); *G01N 21/9515* (2013.01);
(Continued)

(58) Field of Classification Search
CPC ........... G01N 21/8803; G01N 21/8851; G01N 21/9515; G01N 2021/8893;
(Continued)

(56) References Cited

U.S. PATENT DOCUMENTS 5,602,761 A * 2/1997 Spoerre ................. G01H 1/003
702/179
7,303,010 B2 12/2007 De Guzman et al.
(Continued)

FOREIGN PATENT DOCUMENTS

KR 20120076628 A 7/2012
KR 101194413 B1 11/2012
(Continued)

OTHER PUBLICATIONS

Ortiz, A., et al.; "First steps towards a roboticized visual inspection system for vessels", Emerging Technologies and Factory Automation (ETFA), 2010 IEEE Conference on, pp. 1-6, Sep. 13-16, 2010, Bilbao.
(Continued)

*Primary Examiner* — Regis J Betsch
(74) *Attorney, Agent, or Firm* — Fletcher Yoder, P.C.

(57) ABSTRACT

An asset inspection system includes a robot and a server. The robot collects inspection data corresponding to an asset. The server, includes a user interface, a processor, and a memory. The memory includes instructions that, when executed by the processor, cause the processor to receive the inspection data from the robot, display the inspection data via the user-interface, receive feedback on the inspection data via the user interface, generate a human-assisted inspection based on the received feedback, analyze the inspection data via a trained model, generate an automated inspection based on the analysis by the trained model, combine the automated inspection and the human-assisted inspection to generate an inspection report, and transmit the inspection report for review.

17 Claims, 6 Drawing Sheets

(51) Int. Cl.
*G01N 21/95* (2006.01)
*G06N 3/00* (2006.01)
*G06N 3/08* (2006.01)
*G06F 3/0354* (2013.01)
*G06F 16/20* (2019.01)
*H04L 29/08* (2006.01)
*H04W 4/80* (2018.01)
*G01S 17/86* (2020.01)

(52) U.S. Cl.
CPC ............. *G06N 3/008* (2013.01); *G06N 3/084* (2013.01); *G06N 20/00* (2019.01); *H04L 67/12* (2013.01); *G01N 2021/8893* (2013.01); *G01N 2021/9518* (2013.01); *G01S 17/86* (2020.01); *G06F 3/03547* (2013.01); *G06F 16/20* (2019.01); *H04L 67/10* (2013.01); *H04W 4/80* (2018.02)

(58) Field of Classification Search
CPC . G01N 2021/9518; G01S 17/86; G06F 16/20; G06F 3/03547; G06N 20/00; G06N 3/008; G06N 3/084; H04L 67/10; H04L 67/12; H04W 4/80
See application file for complete search history.

(56) References Cited

U.S. PATENT DOCUMENTS

| 7,526,944 | B2 | 5/2009 | Sabata et al. |
| 7,902,524 | B2 | 3/2011 | Safai et al. |
| 9,183,527 | B1* | 11/2015 | Close .................... G06Q 50/06 |
| 9,537,907 | B2 | 1/2017 | Messinger et al. |
| 9,609,288 | B1* | 3/2017 | Richman ................ H04N 7/183 |
| 9,726,569 | B2 | 8/2017 | Koyanagi |
| 2006/0288756 | A1 | 12/2006 | De Meurechy |
| 2014/0358601 | A1 | 12/2014 | Smiley et al. |
| 2017/0097640 | A1* | 4/2017 | Wang ................... G05D 1/0088 |
| 2017/0131214 | A1 | 5/2017 | Gutierrez Perez et al. |

FOREIGN PATENT DOCUMENTS

| KR | 20130035536 A | 4/2013 |
| KR | 101791467 B1 | 10/2017 |

OTHER PUBLICATIONS

Idris, Syahril Anuar, et al.: "Improvement of Corrosion Detection Using Vision System for Pipeline Inspection", Applied Mechanics & Materials, vol. 761, pp. 125-131, 2015.
The International Search Report/Written Opinion, PCT/US2018/056825, dated Feb. 8, 2019; 9 pages.

* cited by examiner

SYSTEMS AND METHOD FOR HUMAN-ASSISTED ROBOTIC INDUSTRIAL INSPECTION

BACKGROUND

The subject matter disclosed herein relates to asset inspection, and more specifically to human-assisted inspection of one or more assets by one or more robots.

Various entities may own or maintain different types of assets as part of their operation. Such assets may include physical or mechanical devices, structures, or facilities which may, in some instances, have electrical and/or chemical aspects as well. Such assets may be used or maintained for a variety of purposes and may be characterized as capital infrastructure, inventory, or by other nomenclature depending on the context. For example, assets may include distributed assets, such as a pipeline or an electrical grid as well as individual or discrete assets, such as an airplane, a wind turbine generator, a radio tower, a steam or smoke stack or chimney, a bridge or other structure, a vehicle, and so forth. Assets may be subject to various types of defects (e.g., spontaneous mechanical defects, electrical defects, as well as routine wear-and-tear) that may impact their operation. For example, over time, the asset may undergo corrosion or cracking due to weather or may exhibit deteriorating performance or efficiency due to the wear or failure of component parts.

Typically, one or more human inspectors may inspect, maintain, and repair the asset. For example, the inspector may locate corrosion on the asset, may locate and quantitatively or qualitatively assess cracks or defects on the asset, may assess an asset for the degree of wear-and-tear observed versus what is expected, and so forth. However, depending on the location, size, and/or complexity of the asset, having one or more human inspectors performing inspection of the asset may take away time for the inspectors to perform other tasks or may otherwise be time consuming and labor intensive, requiring personnel time that might be more productively spent elsewhere. Additionally, some inspection tasks may be dull, dirty, or may be otherwise unsuitable for a human to perform. For instance, some assets may have locations that may not be accessible to humans due to height, confined spaces, or the like. Further, inspections may be performed at times that are based on schedules resulting in either over-inspection or under-inspection.

However, developing a fully autonomous inspection system may involve collecting extremely large amounts of data to assemble training data sets to train the system, as well as acquiring one or more computing systems with significant processing power to run the system. As a result, developing a fully autonomous inspection system may utilize a significant investment of resources.

BRIEF DESCRIPTION

Certain embodiments commensurate in scope with the originally claimed subject matter are summarized below. These embodiments are not intended to limit the scope of the claimed subject matter, but rather these embodiments are intended only to provide a brief summary of possible embodiments. Indeed, the disclosure may encompass a variety of forms that may be similar to or different from the embodiments set forth below.

In one embodiment, an asset inspection system includes a robot and a server. The robot collects inspection data corresponding to an asset. The server, includes a user interface, a processor, and a memory. The memory includes instructions that, when executed by the processor, cause the processor to receive the inspection data from the robot, display the inspection data via the user-interface, receive feedback on the inspection data via the user interface, generate a human-assisted inspection based on the received feedback, analyze the inspection data via a trained model, generate an automated inspection based on the analysis by the trained model, combine the automated inspection and the human-assisted inspection to generate an inspection report, and transmit the inspection report for review.

In another embodiment, an asset inspection system includes a server. The server includes a user interface, a processor, and a memory. The memory includes instructions that, when executed by the processor, cause the processor to receive inspection data from a robot, display the inspection data via the user-interface, receive feedback on the inspection data via the user interface, generate a human-assisted inspection based on the received feedback, analyze the inspection data via a trained model, generate an automated inspection based on the analysis by the trained model, combine the automated inspection and the human-assisted inspection to generate an inspection report, and transmit the inspection report for review.

In a further embodiment, a method of inspecting an asset includes collecting, via a robot, inspection data related to an asset, transmitting the inspection data to a server, displaying the inspection data via a user-interface, receiving feedback on the inspection data via the user interface, generating a human-assisted inspection based on the received feedback, analyzing the inspection data via a trained model, generating an automated inspection based on the analysis by the trained model, combining the automated inspection and the human-assisted inspection to generate an inspection report, and transmitting the inspection report for review.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

One or more specific embodiments will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. Furthermore, any numerical examples in the following discussion are intended to be non-limiting, and thus additional numerical values, ranges, and percentages are within the scope of the disclosed embodiments.

As discussed herein, the present approach relates to human-assisted inspections of assets using robots, unmanned vehicles, or drones and/or inspections implemented by automated or computer-based routines. By way of example, such inspections may be performed using unmanned or robotic devices, such as ground-based mobile robots, including those with legs, wheels, tracks, etc., unmanned aerial vehicles (UAVs), including fixed wing and rotary wing vehicles, unmanned submersible vehicles (USVs), which may swim or move along the floor of the body of liquid, or other autonomously moving vehicles that may be characterized as drones or robots. For simplicity, to the extent the terms "drone" and "robot" are used herein, though it should be appreciated that this terminology is intended to encompass all variations, of UAVs, USVs, robotic devices, and so forth that are capable of programmable movement with limited human oversight. Such programmable movement can be based on either locally generated path waypoints or guidance or path guidance and waypoints generated by a remote system and communicated to the robot. Thus, as used herein, such devices move during an operational phase or period with limited human intervention or oversight. In accordance with present approaches, such devices may be operated to move along a flight plan, along which the devices acquire inspection data, such as video or still image data, LIDAR data, acoustic data, spectroscopic data, temperature or pressure data, chemical samples, smells, or other data that can be acquired by sensors or cameras that can be affixed to a device moving along the flight plan. In general, such inspections may be performed on one or more assets including, but not limited to, power generation assets, communication assets, transportation assets, mining or underground pumping assets, manufacture or construction assets and so forth.

Though the phrase "flight plan" is used generally herein, it should be appreciated that this phrase does not necessitate aerial movement, but instead relates to any one-dimensional (1D) (such as along a track), two-dimensional (2D) (such as along a defined or undefined planar route), or three-dimensional (3D) (such as movement in the air, under water, or on a structure in where depth or altitude is also traversable), or four-dimensional (4D) (such as where there are defined temporal aspects that may characterize a velocity, acceleration, or a time on station at a waypoint) path or route along which a drone moves as part of an inspection plan. Thus, a "flight plan" as used herein may be characterized as any 1D, 2D, 3D, or 4D route or path along which device such as a drone or robot is moved to perform a sensor-based inspection of an asset. Such a path may be adaptive, as discussed herein, and may consist of one or more waypoints along which the robot proceeds in an ordered fashion, with the sequence and location of the waypoints defining the path or route. It should be appreciated that such a flight plan may also incorporate not only temporal and/or spatial locations, but also orientation and/or alignment instructions for movement along the path and/or to exhibit at a given waypoint. Thus, the flight plan may also specify parameters such as roll, pitch, and yaw for the drone to exhibit at different points along the flight plan as well as two- or three-dimensional alignment characteristics that may relate to the direction in which a sensor or camera is pointing at a point along the flight plan. Thus, the flight plan may address not only where or when a robot is with respect to an inspection site but, at a given location or waypoint, the direction the robot is facing or otherwise oriented with respect to. Further, even at the same waypoint and orientation, images may be acquired at different magnifications, wavelengths, or other optical parameter such that effectively the image constitutes a different view. As discussed herein, the present approach facilitates the inspection of assets by acquired sensor data gathered during an inspection.

In addition, in accordance with certain aspects, prior knowledge may be leveraged in the inspection process. For example, prior knowledge may be used in generating or modifying an adaptive flight plan. In certain aspects, machine learning approaches may be employed to learn from human reviewer decisions (e.g., regarding asset condition, data sufficiency, decision oversight, mission planning, etc.), thereby creating a trained artificial neural network based on this prior knowledge that can facilitate future data sufficiency decisions.

To facilitate explanation and provide useful real-world context, various examples such as wind turbine generators, radio transmission towers, smokestacks, and so forth are provided herein. It should be appreciated however that such examples are provided merely to facilitate explanation, and the present approach is suitable for use with a wide range of other assets and at various other types of sites. Thus, the present approach is not intended to be limited to the context of the present examples.

Figure 1:
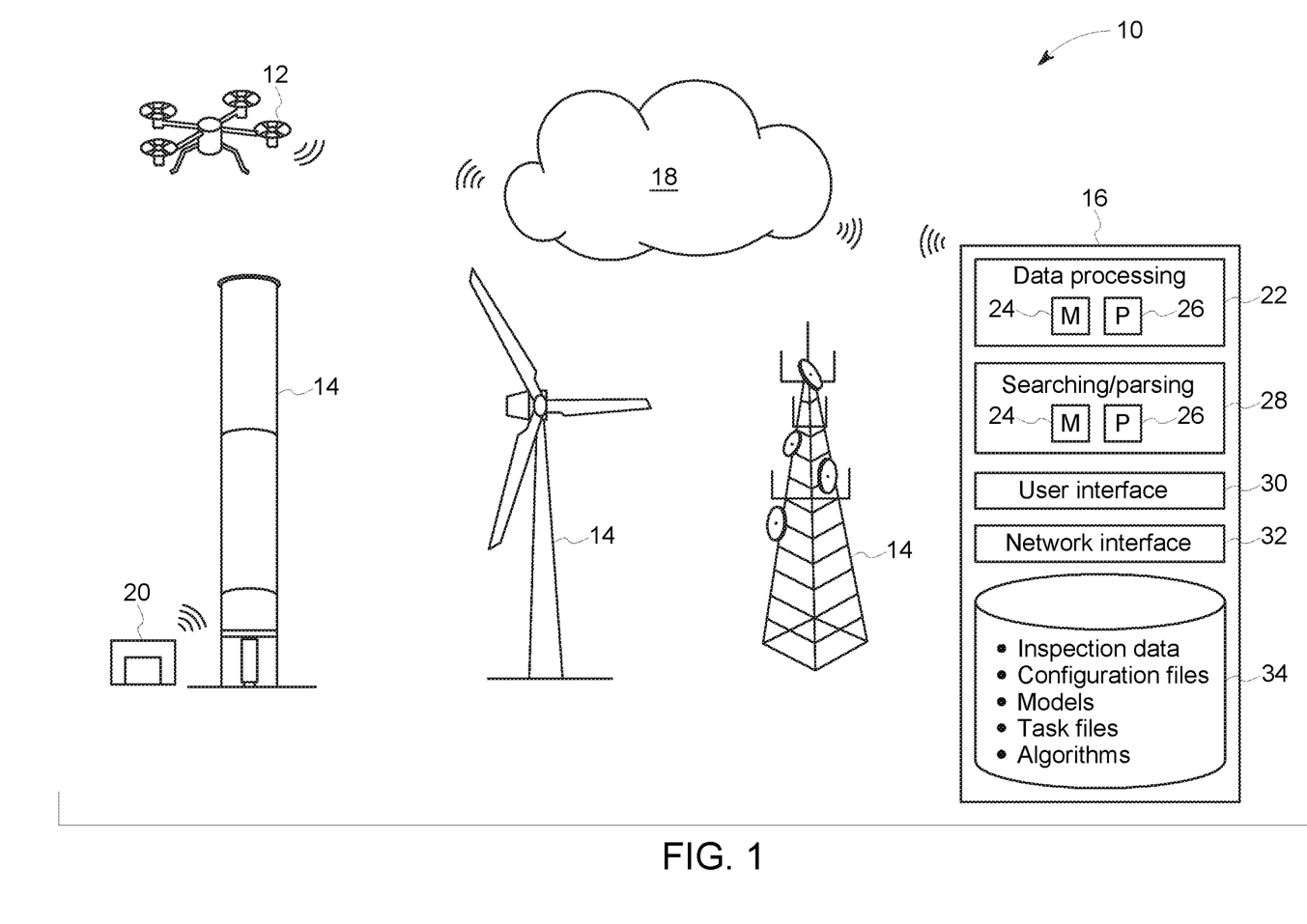
FIG. 1 illustrates an asset inspection system and various types of assets suitable for inspection, in accordance with an embodiment.

With the preceding in mind, and turning to the figures, FIG. 1 depicts aspects of an inspection system 10 employing one or more robots 12 suitable for inspecting one or more assets 14, such as a wind turbine generator, radio tower, smokestack, or other suitable asset.

FIG. 1 also depicts a remote server 16, accessible via a cloud 18 (e.g., a network interface for accessing one or more remote servers, virtual machines, etc. for storage, computing, or other functionality), which may communicate with the one or more robots 12 to coordinate operation of one or more robots 12, such as for inspection of an asset 14. In one embodiment, the robot(s) 12 have onboard cellular or network connectivity and can communicate with the remote server 16 at least prior to beginning an inspection. In certain implementations the cellular or network connectivity of the robot(s) 12 allow communication during an inspection, allowing inspection data to be communicated to the remote server 16 and/or allowing the remote server 16 to communicate feedback to a given robot 12.

As shown, in some embodiments, the system 10 may also include a docking station 20 (e.g., robot garage), disposed on or near the asset 14, for short term or long term storage of the robot 12 before and/or after inspection. In some embodiments, the docking station 20 may be in communication with the remote server 16 via the cloud 18. If the robot 12 relies on a battery for power, the docking station 20 may also include a power source for charging the robot's 12 battery.

In the depicted example, the remote server 16 is a remote computing device accessible by the robot(s) 12 via the cloud 18. Though only a single remote server 16 is shown in FIG. 1, it should be understood that the functions performed by the remote server 16 may be performed by multiple remote servers 16 and/or by virtualized instances of a server environment. In the instant embodiment, the remote server 16 includes a data processing system 22, which may include a memory component 24 and a processor 26, for processing data received from the robot 12. As is described in more detail below, in some embodiments, the robot 12 may provide raw data to the remote server 16 for processing. In other embodiments, the robot 12 may pre-process or partially process the data before passing it to the remote server 16. In further embodiments, all of the data processing may be performed by the robot 12.

The remote server 16 also includes a searching/parsing component 28, which may also include a memory 24 and a processor 26, for searching, parsing, and otherwise interacting with data stored on the remote server 16. A user interface 30 may receive inputs from a user. For example, the data processing system 22 may utilize machine learning (e.g., a trained artificial neural network) that uses inputs from a user provided via the user interface 30. The user inputs may be supervisory in nature (e.g., the user monitors the robot and provides guidance as the robot performs the inspection), corrective (e.g., the user corrects the robot when the robot does something incorrectly), reinforcing (e.g., the user tells the robot when the robot does something correctly), decisive (e.g., the user makes a decision for the robot when prompted), instructive (e.g., identifying features in the asset), etc. In some embodiments, the user may interrupt the robot's inspection with feedback. In other embodiments, the robot may prompt the user by requesting feedback. A network interface 32 facilitates communication between the robot(s) 12 via the cloud 18. As shown, the remote server 16 may store and maintain one or more databases 34. These databases 34 may include inspection data, configuration files, models of assets and/or areas surrounding assets, task files, algorithms, etc.

Following an inspection, or during the inspection, the robot 12 may send inspection data to the remote server 16 for processing, analysis, and/or storage. By way of example, videos, images, LIDAR data, depth sensor data, acoustic data, spectroscopic data, or other relevant sensor or camera data acquired by the one or more robots 12 during an inspection may be uploaded to the database 34 as acquired or as a batch after an inspection flight plan is completed. Alternatively, in other implementations, the inspection data may be provided to the database 34 by other means or channels, such as via direct transmission from the robot 12 and/or via other intermediary communication structures, such as a dedicated inspection data communication circuit.

In the depicted example, the data processing system 22, the database 34, and the searching/parsing component 28 are depicted as part of a single or common processor-based system. However, the depicted functionalities may be implemented in a distributed or dispersed manner, with certain aspects being local to the asset 14, to the robot 12, to an operational facility and/or other locations remote from the asset 14. In such distributed implementations, the depicted aspects may still be communicatively linked, such as over one or more network connections.

In the illustrated embodiment, the data processing system 22 may utilize machine learning to train an algorithm or an artificial neural network based on user feedback provided via the user interface 30. That is, as feedback is provided via the user interface, the data processing system 22 learns how to conduct inspections and process data such that less and less human supervision is needed over time.

Figure 2:
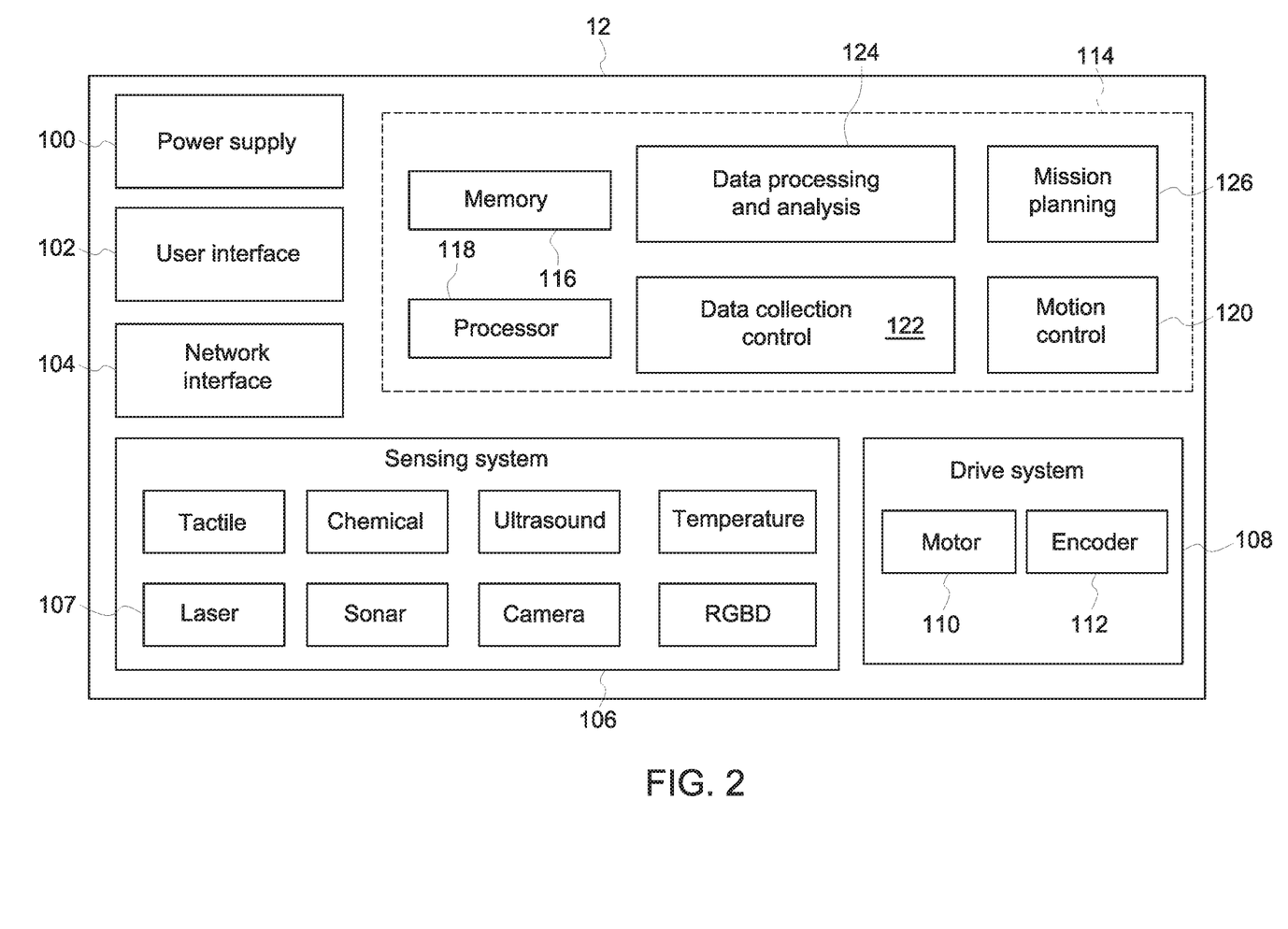
FIG. 2 is a schematic of a robot of the asset inspection system of FIG. 1, in accordance with an embodiment.

FIG. 2 is a schematic of an embodiment of the robot 12 shown in FIG. 1. It should be understood, however, that other embodiments of the robot 12 are envisaged having additional components, fewer components, and/or different combinations of components. As shown, the robot 12 includes a power supply 100 to provide power for the operation of the robot 12. The power supply 100 may include a replaceable or rechargeable battery, a combustion engine, a generator, and electric motor, a solar panel, a chemical-reaction based power generation system, etc., or some combination thereof.

The robot may include a user interface 102, by which a user may set up or adjust various settings of the robot 12. The user interface may include one or more input devices (e.g., knobs, buttons, switches, dials, etc.) and in some cases may include a display (e.g., a screen, array of LEDs, etc.) for providing feedback to the user. Though previously discussed embodiments receive user feedback via the user interface of the remote server, embodiments in which user feedback is provided via the user interface 102 of the robot 12 are also envisaged.

A network interface 104 enables communication with the remote server via the cloud, or other devices (e.g., the docking station, a remote controller, a smart phone, a computing device, a tablet, etc.). For example, the network interface 104 may enable communication via a wireless network connection, a wired network connection, cellular data service, Bluetooth, Near Field Communication (NFC), ZigBee, ANT+, or some other communication protocol. In some embodiments, data sent or received via the network interface may be encrypted. For example, standard data encryption techniques may be utilized, such as hashing (e.g., MD5, RIPEMD-160, RTRO, SHA-1, SHA-2, Tiger, WHIRLPOOL, RNGss, Blum Blum Shub, Yarrowm etc.), key exchange encryption (e.g., Diffie-Hellman key exchange), symmetric encryption methods (e.g., Advanced Encryption Standard (AES), Blowfish, Data Encryption Standard (DES), Twofish, Threefish, IDEA, RC4, Tiny Encryption algorithm, etc.), asymmetric encryption methods (e.g., Rivest-Shamir-Adlemen (RSA), DAS, ElGamal, Elliptic curve cryptography, NTRUEncrypt, etc.), or a combination thereof.

A sensing system 106 may include one or more sensors 107 (e.g., tactile, chemical, ultrasound, temperature, laser, sonar, camera, a red, blue, green, depth (RGB-D) camera, etc.) configured to sense various qualities and collect data corresponding to the asset during inspections.

A drive system 108 may actuate movement of the robot 12 through the air, through a liquid, along a surface, or some combination thereof. As shown, the drive system 108 may include one or more motors 110 and one or more encoders 112. The one or more motors 110 may drive propellers, legs, wheels, tracks, etc. The one or more encoders 112 may sense one or more parameters of the one or more motors 110 (e.g., rotational speed) and provide data to a control system 114.

The control system 114 may include one or more memory components 116 and one or more processors 118. A motion control system 120 may receive a signal from the one or more encoders 112 of the drive system 108 and output a control signal to the one or more motors 110 to control the movement of the robot 12. Similarly, a data collection control system 122 may control the operation of the sensing system 106 and receive data from the sensing system 106. A data processing and analysis system 124 may receive data collected by the sensing system 106 and process or analyze the collected data. In some embodiments, the data processing and analysis system 124 may completely process and analyze the data and make a determination as to the condition of the asset. In other embodiments, the data processing and analysis system 124 may perform pre-processing of the data or a partial processing and analysis of the data and then send the data to the remote server for the remainder of processing and analysis. In further embodiments, the robot may send raw data to the remote server. When user feedback is provided, the data processing and analysis system may take the user inputs into account when processing and/or analyzing the inspection data. In some embodiments, user feedback may be communicated back to the robot 12.

The control system 114 may also include a mission planning component 126. The mission planning component 126 generates a mission plan and executes the mission plan by coordinating the various other components of the control system 114 and the robot 12. In some embodiments, the mission planning component 126 may request additional files or data from the remote server to complete mission plan.

Figure 3:
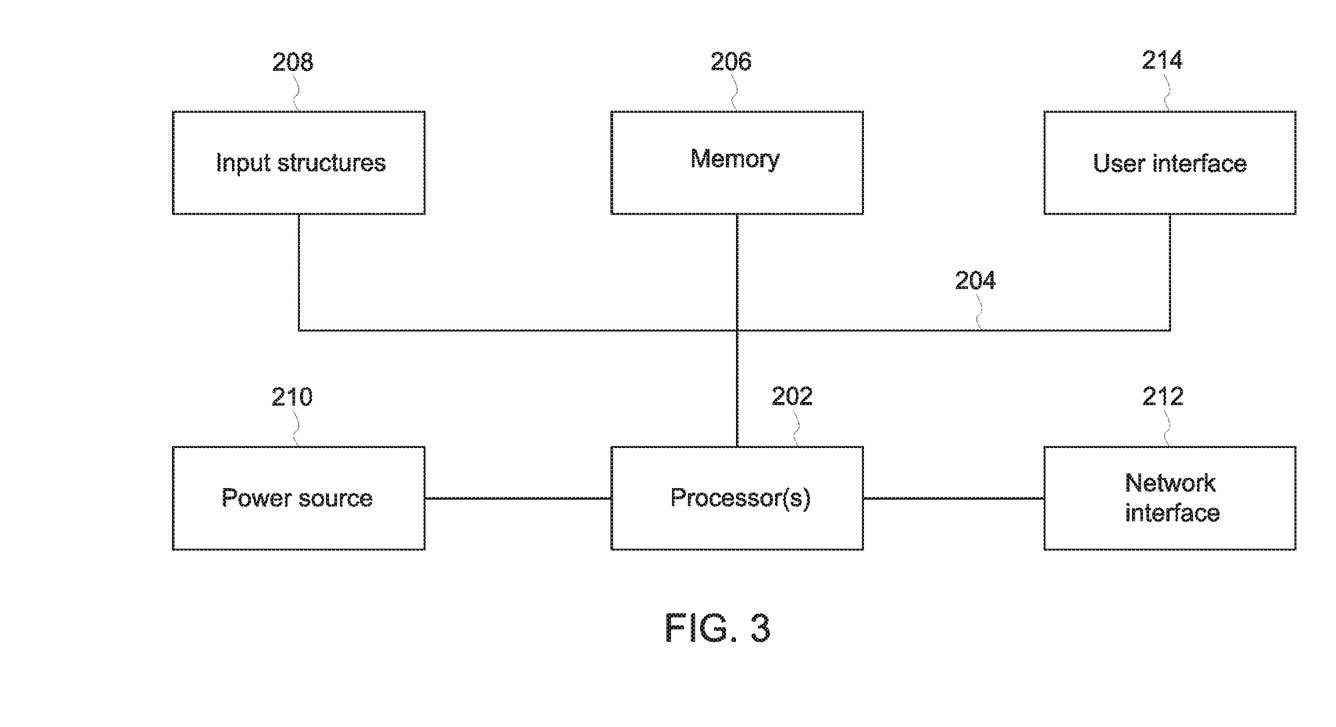
FIG. 3 is a block diagram of a remote server of the asset inspection system of FIG. 1, in accordance with an embodiment.

FIG. 3 generally illustrates a block diagram of example components of a computing device 200 that could be used as the remote server. As used herein, a computing device 200 may be implemented as one or more computing systems including laptop, notebook, desktop, tablet, or workstation computers, as well as server type devices or portable, communication type devices, such a cellular telephones, and/or other suitable computing devices.

As illustrated, the computing device 200 may include various hardware components, such as one or more processors 202, one or more busses 204, memory 206, input structures 208, a power source 210, a network interface 212, a user interface 214, and/or other computer components useful in performing the functions described herein.

The one or more processors 202 are, in certain implementations, microprocessors configured to execute instructions stored in the memory 206 or other accessible locations. Alternatively, the one or more processors 202 may be implemented as application-specific integrated circuits (ASICs), field-programmable gate arrays (FPGAs), and/or other devices designed to perform functions discussed herein in a dedicated manner. As will be appreciated, multiple processors 202 or processing components may be used to perform functions discussed herein in a distributed or parallel manner.

The memory 206 may encompass any tangible, non-transitory medium for storing data or executable routines, including volatile memory, non-volatile memory, or any combination thereof. Although shown for convenience as a single block in FIG. 3, the memory 206 may actually encompass various discrete media in the same or different physical locations. The one or more processors 202 may access data in the memory 206 via one or more busses 204.

The input structures 208 are used to allow a user to input data and/or commands to the device 200 and may include mice, touchpads, touchscreens, keyboards, and so forth. The power source 210 can be any suitable source for providing power to the various components of the computing device 200, including line and battery power. In the depicted example, the device 200 includes a network interface 212. Such a network interface 212 may allow communication with other devices on a network using one or more communication protocols. In the depicted example, the device 200 includes a user interface 214, such as a display configured to display images or date provided by the one or more processors 202. As will be appreciated, in a real-world context a processor-based systems, such as the computing device 200 of FIG. 3, may be employed to implement some or all of the present approach, such as performing the functions of the remote server shown in FIG. 1.

Figure 4:
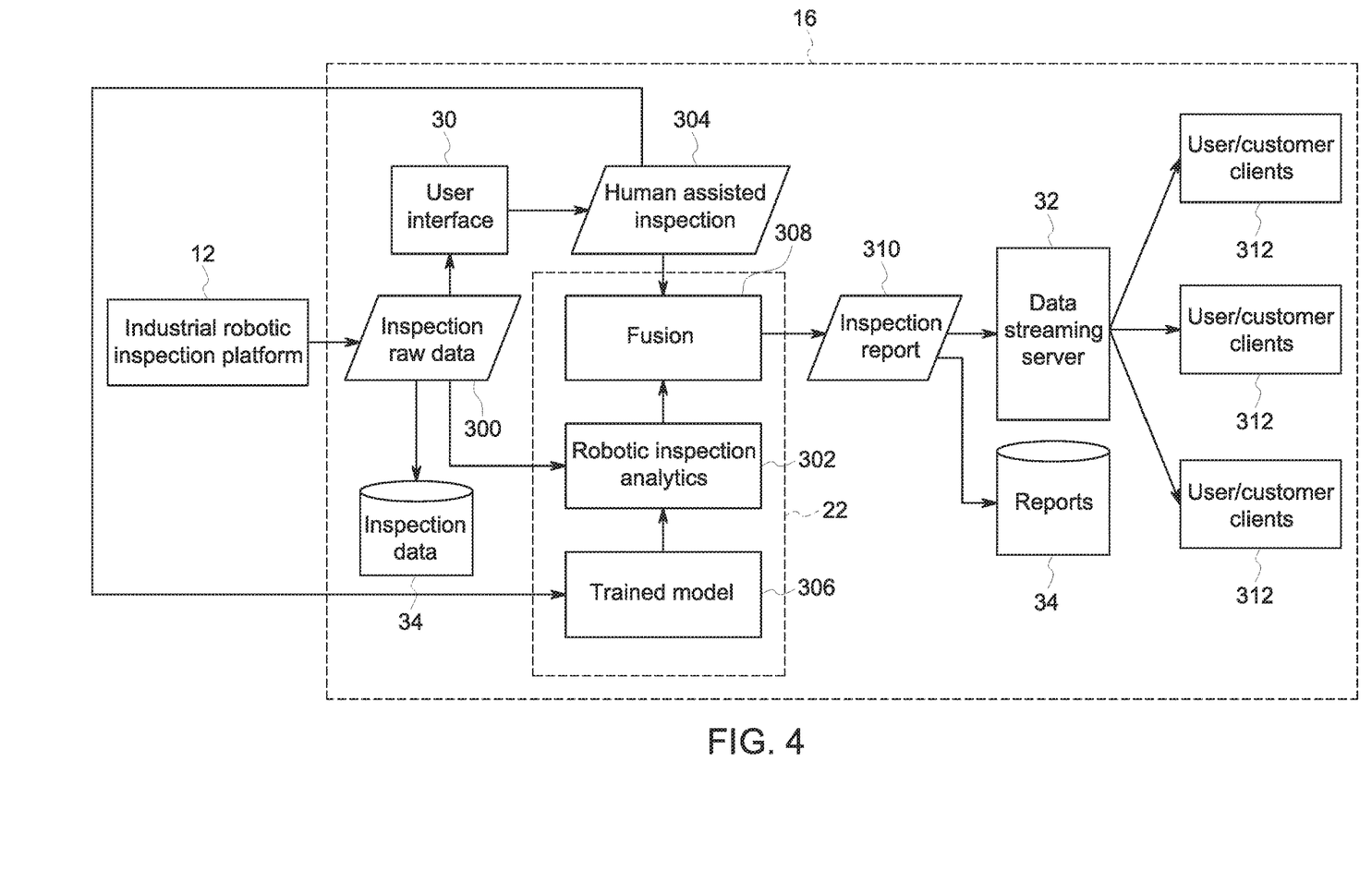
FIG. 4 is a schematic illustrating interactions between the robot and the remote server of the asset inspection system of FIG. 1, in accordance with an embodiment.

FIG. 4 is a schematic illustrating interactions between the robot 12 and the remote server 16. As previously described, the robot 12 and the remote server 16 communicate with one another via respective network interfaces (e.g., communication servers). As previously described, the robot 12 conducts the inspection according to the mission plan. Data 300 is then output. Though FIG. 4 shows raw data 300 being output by the robot. In some embodiments, the robot 12 may perform some conditioning, pre-processing, or processing before transmitting the data 300. As previous described, the data 300 may be output while the inspection is ongoing (e.g., continuously or in batches), or after the inspection is complete. The data 300 is dispatched via two channels: to the user interface 30 for human review, and to a robotic inspection analytics component 302 of the data processing system 22 for automated inspection analysis. In some embodiments, the data 300 may also be copied to an inspection data database 34 for storage.

For human inspection, data 300 (e.g., raw data, pre-processed data, processed data, etc.) are displayed to the user via the user interface 30. For example, the user may use the user interface 30 to review images, video, plots, graphs, spreadsheets, scores, etc. The user may provide feedback via the user interface 30. For example, the feedback may be concerned with the condition of the asset, the sufficiency of the collected data, how the inspection was performed, whether more inspection is needed, etc. The human inspection may be performed at the beginning of an asset inspection, continuously throughout inspection, of following inspection. For example, in some embodiments, the user may provide feedback at the beginning of the inspection. A trained model 306 of the data processing system 22 may then be trained based on the inputs to improve the model. Such that less and less human input is needed as the inspection goes on. The human assisted inspection results are packaged into a standard description file and provided to a fusion component 308 for combination with the automated inspection results.

For automated inspection analysis, data 300 is received by the robotic inspection analytics component 302 and analyzed using the trained model 306. Analysis of the data 300 may be with regard to, for example, the condition of the asset (e.g., detecting corrosion, recognizing an anomaly, etc.), the sufficiency of the collected data, how the inspection was performed, whether more inspection is needed, etc. The inspection algorithms used by the robotic inspection analytics component 302 may be fixed or flexible, and may include deep learning, cascade, DPM, intensity, etc. The trained model 306 may be pre-trained using pre-collected training data and runs continuously without human intervention. The automated inspection results are packaged into a standard description file and provided to the fusion component 308 for combination with the human-assisted inspection results. The automated inspection results may be provided to the fusion component 308 continuously, when each processing cycle is done, periodically in batches, at the end of inspection, etc.

The fusion component 308 combines the human-assisted inspection results with the automated inspection results and generates an inspection report 310. In one embodiment, the human-assisted inspection results and the automated inspection results are labeled as either bounding boxes or pixels. The two sets of results may be quickly combined via the bitwise logic operation AND and OR. Wherein AND is focused on the common recognition results between robots and humans and OR is focused on unifying the recognition results from robots and humans. The bitwise logic operation provides fast and efficient processing for some use cases. In another embodiment, a weighted operation may be utilized wherein the human-assisted inspection results and the automated inspection results are be given weights and combined to determine confidence scores. For example, the regions and pixels may be labeled as anomalies with corresponding confidence scores. The confidence scores for each of the human-assisted inspection results and the automated inspection results may be multiplied by the respective weights and added together to determine the overall confidence score. In some embodiments, a clustering based post processing may be performed following the weighted operation to avoid small and/or noisy regions. The weighted operation helps to adaptively incorporate results from humans and robots. The weights may reinforce the regions with high confidence and inhibit the regions with low confidence. In another embodiment, a Kalman-filter may be utilized to probabilistically combine the recognition results from humans and robots. The Kalman-filter is normally used to deal with very noisy and uncertain environments in an on-line estimation process. In a further embodiment, a decision-making operation may be utilized wherein rules are pre-stored on the system. IF, AND/OR, THEN are then used to assign each region a result of inspection. The decision-making operation is based on a knowledge base where the robot can retrieve rules from. The rules can be updated when humans' intervention is given.

The human assisted inspection 304 acts as a supplement to the automated inspection prepared by the robotic inspection analytics component 302. Early on, the feedback provided by the user via the user interface 30 that constitutes the human assisted inspection 304 may be substantial. The feedback may include identification features (e.g., corrosion, cracks, decay, damage, etc.) in the asset, feedback as to the sufficiency of the collected data (e.g., lighting, ambient noise, wind, malfunctioning sensors, etc. may affect inspection data collection), feedback as to how the robot conducted the inspection, etc. The feedback provided is used to periodically retrain the trained model 306 such that a training data set is developed and modified over time as inspections are performed. As the size of the training data set increases, and as the trained model 306 learns more and more, less and less human feedback is provided during inspection. Accordingly, in some embodiments, inspections may be performed without any user feedback. That is, the human assisted inspection 304 may not contain any modifications to the automated inspection. In such cases, the fusion component 308 may just convert the automated inspection into the inspection report 310. As such, as time progresses, the automated inspection may account for more and more of the inspection report until, for some inspections, the automated inspection may account for the entirety of the inspection report 310.

The inspection report 310 generated by the fusion component 308 may be saved in a reports database 34 and passed to a data streaming server 32 (e.g., network interface). The data streaming server 32 then provides the inspection report 310 to one or more users, customers, or clients for review.

Figure 5:
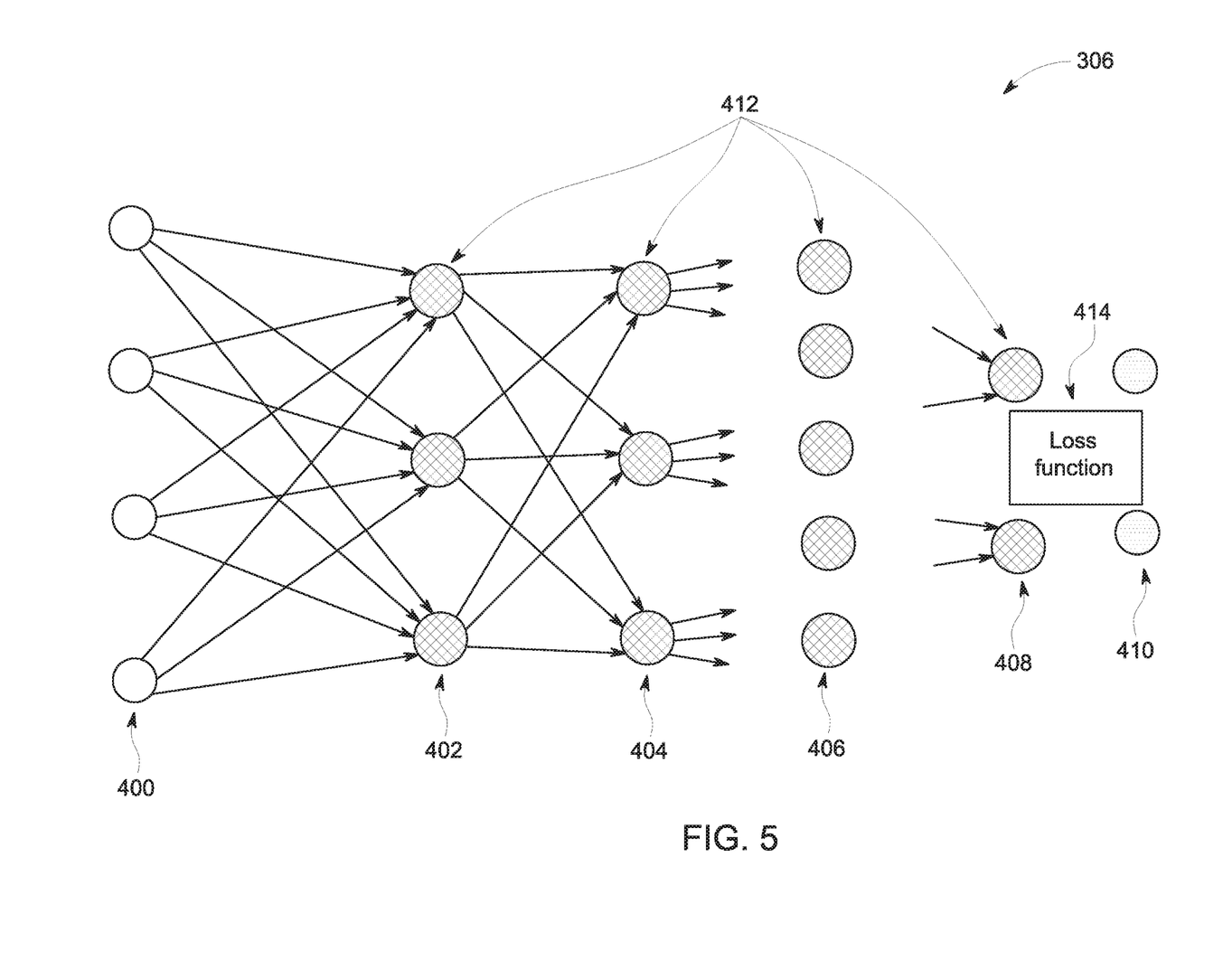
FIG. 5 is a schematic illustrating an example of a trained model as shown in FIG. 4, in accordance with an embodiment.

FIG. 5 schematically depicts an example of the trained model 306 (e.g., artificial neural network) that may be trained as a deep learning model as discussed herein. In this example, the network 306 is multi-layered, with a training input 400 and multiple layers including an input layer 402, hidden layers 404, 406, and so forth, and an output layer 408 and the training target 410 present in the network 306. Each layer, in this example, is composed of a plurality of "neurons" or nodes 412. The number of neurons 412 may be constant between layers or, as depicted, may vary from layer to layer. Neurons 412 at each layer generate respective outputs that serve as inputs to the neurons 412 of the next hierarchical layer. In practice, a weighted sum of the inputs with an added bias is computed to "excite" or "activate" each respective neuron of the layers according to an activation function, such as rectified linear unit (ReLU), sigmoid function, hyperbolic tangent function, or otherwise specified or programmed. The outputs of the final layer constitute the network output 408 which, in conjunction with a target value or construct 410, are used to compute some loss or error function 414, which will be backpropagated to guide the network training.

The loss or error function 414 measures the difference between the network output 408 and the training target 410. In certain implementations, the loss function may be a mean squared error (MSE). Alternatively, the loss function 414 could be defined by other metrics associated with the particular task in question, such as a softmax function.

With the preceding in mind, the neural network 306 may be trained for use in the analysis of data in a manner that facilitates ranking or identification of relevant features based on their relevance to a given task(s) and, potentially, selection of some or all of these features for a given application or use. In particular, the present disclosure describes an approach to process or analyze asset inspection data.

Figure 6:
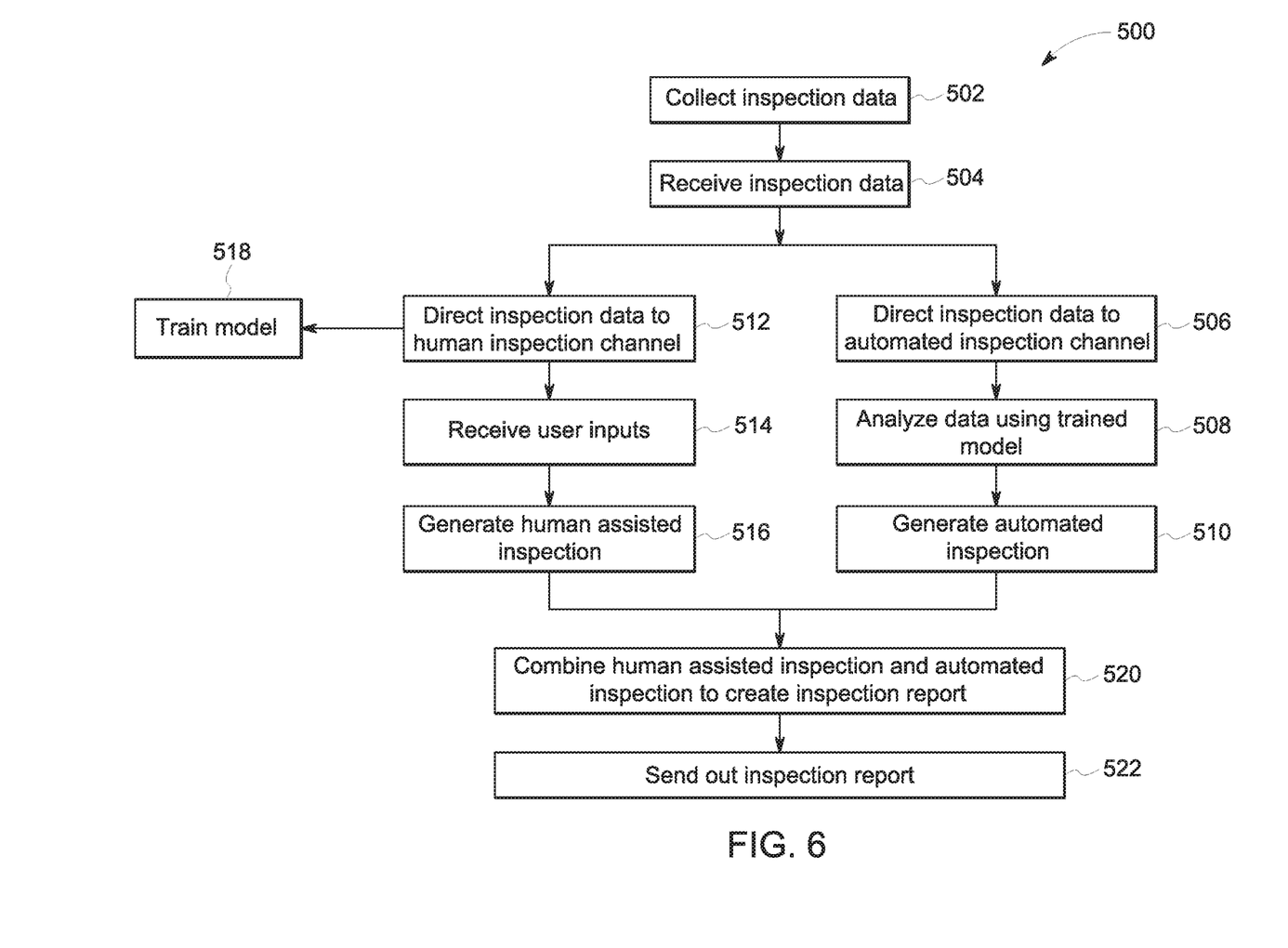
FIG. 6 is a flow chart of a process for performing a human-assisted inspection via the robot of FIG. 1, in accordance with an embodiment.

FIG. 6 is a flow chart of a process 500 for conducting a human-assisted robotic inspection of an asset. In block 502, one or more robots are used to collect inspection data. The inspection data may include, for example, video or still image data, LIDAR data, acoustic data, spectroscopic data, temperature or pressure data, chemical samples, smells, or other data that can be acquired by sensors or cameras that can be affixed to a device moving along the flight plan. At block 504, the collected data is transmitted (e.g., via the cloud) to a remote server. The data received by the remote server may be raw, conditioned, pre-processed, partially processed, or processed, etc. At block 506, the received data is directed to an automated inspection channel. At block 508 the inspection data may be analyzed using a trained model. At block 510, the analyzed data is incorporated into an automatic inspection report.

At block 512 the received data is directed to a human inspection channel. At block 514, the user reviews the data via a user interface and provides feedback. The provided inputs may include, for example, decisions, positive reinforcement, negative reinforcement, instructions, etc. At block 516 a human-assisted inspection is generated. In some embodiments, the user inputs may be used to train or retrain the model (block 518).

At block 520, the human-assisted inspection and the automated inspection are combined to create an inspection report. As previously described, this combination may be accomplished via bitwise logic operation, weighted operation, a decision making operation, or a combination thereof. At block 522, the inspection report is sent out to one or more users, customers, or clients for review.

The presently disclosed techniques utilize one or more robots to perform a human-assisted inspection of an asset. The one or more robots may be in communication with a remote server. The robot transmits inspection data to the remote server for analysis. Automated analysis of the inspection data is performed using a trained model, resulting in an automated inspection. The inspection data is also displayed to a user via a user interface. The user may provide feedback via the user interface. Based on the feedback received, a human-assisted inspection is generated. The user feedback may also be used to periodically train or retrain the trained model. The automated inspection and the human-assisted inspection are then combined to generate an inspection report, which may be transmitted for review by the user, customer, or client.

This written description uses examples to disclose the claimed subject matter, including the best mode, and also to enable any person skilled in the art to practice the disclosed subject matter, including making and using any devices or systems and performing any incorporated methods. The patentable scope of the claimed subject matter is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. An asset inspection system, comprising:
   a robot configured to collect inspection data of an asset; and
   a server, comprising:
      a user interface;
      a processor; and
      a memory comprising instructions that, when executed by the processor, cause the processor to:
         receive the inspection data from the robot;
         display the inspection data via the user interface;
         receive feedback on one or more aspects of the inspection data via the user interface;
         generate, based on the feedback, human-assisted inspection results corresponding to a first set of measured quantitative parameters for the one or more aspects of the inspection data as determined based on the received feedback;
         analyze the inspection data via a trained model;
         generate, via analysis of the trained model, automated inspection results corresponding to a second set of measured quantitative parameters for the one or more aspects of the inspection data as determined based on the analysis by the trained model;
         assign first weight values to the first set of measured quantitative parameters and second weight values to the second set of measured quantitative parameters, wherein the first set of measured quantitative parameters has an associated first confidence score and the second set of measured quantitative parameters has an associated second confidence score:
         combine the first set of measured quantitative parameters weighted by the first weight values and the second set of measured quantitative parameters weighted by the second weight values to generate an inspection report having an overall confidence score and including the weighted, combined human-assisted inspection results and the automated inspection results; and
         transmit the inspection report to a client.

2. The asset inspection system of claim 1, wherein the server is disposed remote from the robot, and wherein the robot and the server are configured to communicate with one another via a cloud interface.

3. The asset inspection system of claim 1, wherein the automated inspection results and the human-assisted inspection results are combined via a decision making operation.

4. The asset inspection system of claim 1, wherein the robot is configured to process, partially process, or pre-process the inspection data.

5. The asset inspection system of claim 1, wherein the robot is configured to transmit raw collected inspection data to the server.

6. The asset inspection system of claim 1, wherein the server is configured to train the trained model using the feedback received via the user interface.

7. The asset inspection system of claim 1, wherein the first weight values and the second weight values are adjusted over time based on a size of training data included in the trained model to facilitate adaptive incorporation of the human-assisted inspection results and the automated inspection results in the inspection report.

8. The asset inspection system of claim 1, wherein the one or more aspects include a sufficiency indication of the inspection data.

9. The asset inspection system of claim 1, wherein the one or more aspects include indicators of a condition of the asset.

10. An asset inspection system, comprising a server, the server comprising:
   a user interface;
   a processor; and
   a memory comprising instructions that, when executed by the processor, cause the processor to:
      receive inspection data from a robot;
      display the inspection data via the user interface;
      receive feedback on one or more aspects of the inspection data via the user interface;
      generate, based on the feedback, human-assisted inspection results corresponding to a first set of measured quantitative parameters for the one or more aspects of the inspection data as determined based on the received feedback;
      analyze the inspection data via a trained model;
      generate, via analysis of the trained model, automated inspection results corresponding to a second set of measured quantitative parameters for the one or more aspects of the inspection data as determined based on the analysis by the trained model;
      assign first weight values to the first set of measured quantitative parameters and second weight values to the second set of measured quantitative parameters, wherein the first set of measured quantitative parameters has an associated first confidence score and the second set of measured quantitative parameters has an associated second confidence score;
      combine the first set of measured quantitative parameters weighted by the first weight values and the second set of measured quantitative parameters weighted by the second weight values to generate an inspection report having an overall confidence score and including the weighted, combined human-assisted inspection results and the automated inspection results; and
      transmit the inspection report to a client.

11. The asset inspection robot of claim 10, wherein the automated inspection results and the human-assisted inspection results are combined via a decision making operation.

12. The asset inspection robot of claim 10, wherein the feedback comprises identification of one or more features in an asset.

13. The asset inspection robot of claim 10, wherein the feedback comprises a determination as to a sufficiency of the inspection data.

14. The asset inspection robot of claim 10, wherein the server is configured to train the trained model using the feedback received via the user interface.

15. A method of inspecting an asset, comprising:
collecting, via a robot, inspection data related to the asset;
transmitting the inspection data to a server;
displaying the inspection data via a user interface;
receiving feedback on one or more aspects of the inspection data via the user interface;
generating, based on the inspection data, human-assisted inspection results corresponding to a first set of measured quantitative parameters for the one or more aspects of the inspection data as determined based on the received feedback;
analyzing the inspection data via a trained model;
generating, via analysis of the trained model, automated inspection results corresponding to a second set of measured quantitative parameters for the one or more aspects of the inspection data as determined based on the analysis by the trained model;
assign first weight values to the first set of measured quantitative parameters and second weight values to the second set of measured quantitative parameters, wherein the first set of measured quantitative parameters has an associated first confidence score and the second set of measured quantitative parameters has an associated second confidence score;
combining the first set of measured quantitative parameters weighted by the first weight values and the second set of measured quantitative parameters weighed by the second weight values to generate an inspection report having an overall confidence score and including the weighted, combined human-assisted inspection results and the automated inspection results; and
transmitting the inspection report to a client.

16. The method of claim 15, wherein the automated inspection results and the human-assisted inspection results are combined via a decision making operation.

17. The method of claim 15, comprising retraining the trained model using the feedback received via the user interface.

* * * * *